Patented Nov. 9, 1937

2,098,239

UNITED STATES PATENT OFFICE 2,098,239

SYNTHESIS OF CYCLOPROPANE

Henry B. Hass and George E. Hinds, West Lafayette, Ind., assignors to Purdue Research Foundation, West Lafayette, Ind., a corporation of Indiana No Drawing. Application March 26, 1934, Serial No. 717,429

15 Claims. (Cl. 260—167)

It is the object of our invention to produce cyclopropane simply and inexpensively, from trimethylene chloride (1,3-dichloropropane).

Although cyclopropane has long been produced from trimethylene bromide, and has also been produced from trimethylene chlorobromide, so far as we are aware no one has ever before succeeded in producing it from trimethylene chloride, although many attempts to do so have been made. Indeed, so far as we are aware, no ring closure to produce a cyclic hydrocarbon has been effected from any dichloro-hydrocarbon.

The principal method heretofore used for preparing cyclopropane is as follows:

*Prior Method A.*—Trimethylene glycol is caused to react with hydrobromic acid in the presence of sulphuric acid. This yields trimethylene bromide (1,3-dibromopropane), and water. The trimethylene bromide is caused to react with zinc, in the presence of water, alcohols, or acetic acid; which yields zinc bromide, and the desired cyclopropane. Magnesium and sodium have been used instead of zinc.

Another method of preparing cyclopropane is known, but is not commercial. It is as follows:

*Prior Method B.*—Trimethylene glycol is caused to react with hydrochloric acid; which yields trimethylene chlorohydrin and water. This trimethylene chlorohydrin is caused to react with hydrobromic acid in the presence of sulphuric acid; which yields trimethylene chlorobromide (1-bromo-3-chloropropane), and water. The trimethylene chlorobromide is caused to react with magnesium; which yields magnesium chlorobromide, and the desired cyclopropane.

Both of these prior methods are expensive, for they involve the use of trimethylene glycol and of hydrobromic acid, and these are both costly. The trimethylene glycol can not be recovered, for it furnishes the carbon and hydrogen atoms for the cyclopropane. The bromine can be recovered, and it is necessary to recover it to keep down the cost. Even though the bromine is recovered, the cost of cyclopropane has been so high that in using it as an anesthetic, where it has great advantages, it has been necessary to provide complicated apparatus for purifying the patient's exhaled breath, adding oxygen to it, and having the patient re-breathe the cyclopropane which was contained in his exhaled breath; as otherwise the cost was prohibitive.

Although by using zinc or magnesium, or sodium in Prior Method A, with a trimethylene compound containing bromine, it has been possible to obtain a closure of the ring to yield cyclopropane, that has not been found possible heretofore when the trimethylene compound was free from bromine, as in trimethylene chloride.

We have found that it is possible to produce such a ring closure from trimethylene chloride.

The trimethylene chloride used may be produced in any desired manner. However, the desirability of our process for producing cyclopropane is enhanced not only by the fact that trimethylene chloride is much cheaper than either trimethylene bromide or trimethylene chlorobromide, but also by the fact that it can now be obtained at a fraction of the expense which its preparation formerly involved; for it can be obtained as a chlorination product of propane or of 1-chloropropane, in the manner set forth in the co-pending application of one of us (Hass) and Earl T. McBee, Serial No. 723,366, filed May 1, 1934, now Patent No. 2,004,073 granted June 4, 1935.

In using trimethylene chloride, we cause it to react with zinc or magnesium or sodium; and obtain the desired cyclopropane, with a chloride of the metal as a by-product. The summarizing equation showing the reaction when zinc is used is as follows:

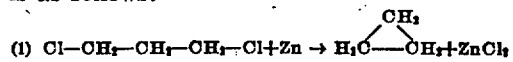

The summarizing equations for magnesium and sodium are similar.

In order to obtain cyclopropane from trimethylene chloride, by reaction with zinc, magnesium, or sodium, certain conditions of reaction should be maintained. These conditions are in general those which are necessary for preparing normal alkyl magnesium chlorides from normal alkyl chlorides and magnesium; in that there must be present substantially no compound containing hydrogen displaceable by the metals used under the conditions employed in the reaction, and that the temperature must be sufficiently high to initiate the reaction. The temperature necessary depends on the metal used, and is highest for zinc and lowest for magnesium for a given reaction rate.

It is usually necessary either to use a catalyst to start the reaction or to raise the temperature above the normal boiling point of the trimethylene chloride; and if no solvent is used such raising of the temperature involves high-pressure operation and apparatus, which is usually not desired. Therefore, we prefer to use a boiling-point-raising solvent which has a boiling point above that of trimethylene chloride. Any such solvent which dissolves trimethylene chloride may be used which is suitable for use in preparing the Grignard reagent and which is substantially unattacked by the reagents and/or reaction products under the conditions employed. The most effective groups of solvents are the higher-boiling ethers, such as diphenyl ether and dibutyl ether, and the higher-boiling hydrocarbons, such as diphenyl. We prefer to use no catalyst with either zinc or sodium; but in using magnesium we may use a catalyst instead of or in addition to heat to initiate the reaction, and in that case we may use a preformed Grignard reagent or any catalyst which is used in preparing the Grignard reagent.

The following are examples of our process:

Example 1.—Diphenyl ether, the boiling point of which is 259° C., has a maximum quantity of zinc dust added to it so that the mixture still stirs fairly easily, and a sufficient quantity of trimethylene chloride to lower the boiling point to the neighborhood of 180° to 210° C. The whole is heated to that boiling point, with stirring, and a gas is evolved which is almost wholly the desired cyclopropane. As the cyclopropane is evolved, additional trimethylene chloride is desirably added, and the boiling point is thus maintained within the range given. The gas evolved is collected; and the cyclopropane is purified, as by rectification of the liquefied material, if that is desired or necessary.

The process is continued as long as the reaction proceeds actively; but in time the zinc particles become coated with the zinc chloride which is formed as a by-product, and the reaction gradually slows down. When this occurs, the zinc mass is separated from the solvent, as by decanting or filtering, and washed with any solvent, such as ethyl ether, which dissolves the zinc chloride from the zinc particles; whereupon the cleaned zinc dust may be used again. The zinc chloride, separated as such by evaporation of the ethyl ether, is a valuable by-product.

Example 2.—Diphenyl, which boils at 252° C., has from 5% to 10% by weight of metallic sodium added to it, and then enough trimethylene chloride to reduce the boiling point to the neighborhood of 170° to 200° C. Some reaction occurs at room temperature, although a very slow one; but the reaction may be accelerated by heating, desirably to the boiling point, without danger that it will become too violent. In either instance, slowly in the cold and more rapidly on heating, a gas is evolved which is rich in cyclopropane. The cyclopropane may be purified as before, as by liquefaction and rectification.

Example 3.—n-Butyl ether, which boils at 141.7° C., has magnesium turnings or powder added to it, in any desired amount so long as the amount of solid material either originally present or produced in the reaction is kept sufficiently small to avoid interference with stirring. Then a small amount of trimethylene chloride is added, usually not to exceed 5%, and the mass heated until boiling occurs. A gas is evolved, which is rich in cyclopropane. As the reaction proceeds, more trimethylene chloride may be added, either slowly and continuously or in small increments. After the reaction is going well, the heating may be discontinued, for the reaction is exothermic. If desired, a small amount of a catalyst may be added initially to start the reaction; suitable catalysts are ethyl iodide or free iodine, or preferably a preformed Grignard reagent.

In all of these examples, and especially in Examples 2 and 3 where sodium and magnesium are used, it is desirable to maintain rather rigorously anhydrous conditions. This is also desirable when zinc is used, although not so essential; but in any case there should be substantial freedom from water or other substance which contains displaceable hydrogen.

We claim as our invention:

1. The process of producing cyclopropane, which consists in causing trimethylene chloride to react with a metal of the class consisting of zinc, magnesium, and sodium, in the substantial absence of any compound containing hydrogen displaceable by the metal used under the conditions employed in the reaction, and under boiling-point-raising conditions and at a temperature above the normal boiling point of trimethylene chloride; to obtain a chloride of the metal, and cyclopropane.

2. The process of producing cyclopropane, which consists in causing trimethylene chloride to react with a metal of the class consisting of zinc, magnesium, and sodium at a temperature which is above the normal boiling point of trimethylene chloride.

3. The process of producing cyclopropane, which consists in causing trimethylene chloride to react with a metal of the class consisting of zinc, magnesium and sodium, in a solvent for trimethylene chloride, which solvent contains substantially no hydrogen displaceable from it by the metal used under the conditions employed in the reaction and is a boiling-point-raising solvent, and maintaining the temperature higher than the boiling point of trimethylene chloride.

4. The process of producing cyclopropane, which consists in causing trimethylene chloride to react with a metal of the class consisting of zinc, magnesium, and sodium at a temperature which is above the normal boiling point at trimethylene chloride, in a solvent of the class consisting of boiling-point-raising ethers and hydrocarbons.

5. The process of producing cyclopropane, which consists in causing trimethylene chloride to react with zinc, at a temperature which is above the normal boiling point of trimethylene chloride, and in the substantial absence of any compound containing hydrogen displaceable by zinc under the conditions employed in the reaction; to yield a chloride of the metal, and cyclopropane.

6. The process of producing cyclopropane, which consists in causing trimethylene chloride to react with magnesium, at a temperature which is above the normal boiling point of trimethylene chloride, and in the substantial absence of any compound containing hydrogen displaceable by magnesium under the conditions employed in the reaction; to yield a chloride of the metal, and cyclopropane.

7. The process of producing cyclopropane, which consists in causing trimethylene chloride to react with sodium, in a boiling-point-raising solvent and in the substantial absence of any compound containing hydrogen displaceable by sodium under the conditions employed in the reaction; to yield a chloride of the metal, and cyclopropane.

8. The process of producing cyclopropane, which consists in causing trimethylene chloride to react with sodium at a temperature above the boiling point of trimethylene chloride under boiling-point-raising conditions at superatmospheric pressure and in the substantial absence of any compound containing hydrogen displaceable by sodium under the conditions employed in the reaction.

9. The process of producing cyclopropane, which comprises causing trimethylene chloride to react with a metal exhibiting an affinity for chlorine, to yield a chloride of the metal and cyclopropane.

10. The process of producing cyclopropane, which comprises causing trimethylene chloride to react with a metal exhibiting an affinity for chlorine, in the presence of a suitable catalyst of the class consisting of preformed Grignard reagents and substances which catalyze the formation of the Grignard reagents, to yield a chloride of the metal and cyclopropane.

11. The process of producing cyclopropane, which comprises causing trimethylene chloride to react with a metal exhibiting an affinity for chlorine, at a temperature above the boiling point of trimethylene chloride, so that the chlorine atoms of the trimethylene chloride combine with the metal and the trimethylene chloride is converted into cyclopropane.

12. The process of producing cyclopropane, which comprises causing trimethylene chloride to react with a metal exhibiting an affinity for chlorine, at a temperature above the normal boiling point of trimethylene chloride, and in the presence of a solvent that is free of hydrogen displaceable by the metal under the conditions employed in the reaction, so that the chlorine atoms of the trimethylene chloride combine with the metal and the trimethylene chloride is converted into cyclopropane.

13. The process of producing cyclopropane, which comprises causing trimethylene chloride to react with a metal exhibiting an affinity for chlorine, at a temperature above the normal boiling point of trimethylene chloride, and in the presence of a solvent that is free of hydrogen displaceable by the metal under the conditions employed in the reaction, which solvent boils at a temperature above the normal boiling point of trimethylene chloride, so that the chlorine atoms of the trimethylene chloride combine with the reagent and the trimethylene chloride is converted into cyclopropane.

14. The process of producing cyclopropane, which comprises causing trimethylene chloride to react with a metal exhibiting an affinity for chlorine, at a temperature above the normal boiling point of trimethylene chloride, and in the presence of a solvent that is free of hydrogen displaceable by the metal under the conditions employed in the reaction, which solvent boils at a temperature above the normal boiling point of trimethylene chloride, and in the presence of a suitable catalyst of the class consisting of preformed Grignard reagents and substances which catalyze the formation of Grignard reagents, to yield a chloride of the metal and cyclopropane.

15. The process of producing cyclopropane, which consists in causing trimethylene chloride to react with sodium at a temperature above the boiling point of trimethylene chloride under boiling-point-raising conditions and in the substantial absence of any compound containing hydrogen displaceable by sodium under the conditions employed in the reaction.

HENRY B. HASS.
GEORGE E. HINDS.

CERTIFICATE OF CORRECTION.

Patent No. 2,098,239.                                   November 9, 1937.

HENRY B. HASS, ET AL.

It is hereby certified that error appears in the printed specification of the above numbered patent requiring correction as follows: Page 2, second column, line 40, claim 4, for "at" read of; line 64, claim 7, after "react" insert the words at a temperature above the boiling point of trimethylene chloride; and that the said Letters Patent should be read with this correction therein that the same may conform to the record of the case in the Patent Office.

Signed and sealed this 25th day of January, 1938.

(Seal)
Henry Van Arsdale,
Acting Commissioner of Patents.

compound containing hydrogen displaceable by sodium under the conditions employed in the reaction.

9. The process of producing cyclopropane, which comprises causing trimethylene chloride to react with a metal exhibiting an affinity for chlorine, to yield a chloride of the metal and cyclopropane.

10. The process of producing cyclopropane, which comprises causing trimethylene chloride to react with a metal exhibiting an affinity for chlorine, in the presence of a suitable catalyst of the class consisting of preformed Grignard reagents and substances which catalyze the formation of the Grignard reagents, to yield a chloride of the metal and cyclopropane.

11. The process of producing cyclopropane, which comprises causing trimethylene chloride to react with a metal exhibiting an affinity for chlorine, at a temperature above the boiling point of trimethylene chloride, so that the chlorine atoms of the trimethylene chloride combine with the metal and the trimethylene chloride is converted into cyclopropane.

12. The process of producing cyclopropane, which comprises causing trimethylene chloride to react with a metal exhibiting an affinity for chlorine, at a temperature above the normal boiling point of trimethylene chloride, and in the presence of a solvent that is free of hydrogen displaceable by the metal under the conditions employed in the reaction, so that the chlorine atoms of the trimethylene chloride combine with the metal and the trimethylene chloride is converted into cyclopropane.

13. The process of producing cyclopropane, which comprises causing trimethylene chloride to react with a metal exhibiting an affinity for chlorine, at a temperature above the normal boiling point of trimethylene chloride, and in the presence of a solvent that is free of hydrogen displaceable by the metal under the conditions employed in the reaction, which solvent boils at a temperature above the normal boiling point of trimethylene chloride, so that the chlorine atoms of the trimethylene chloride combine with the reagent and the trimethylene chloride is converted into cyclopropane.

14. The process of producing cyclopropane, which comprises causing trimethylene chloride to react with a metal exhibiting an affinity for chlorine, at a temperature above the normal boiling point of trimethylene chloride, and in the presence of a solvent that is free of hydrogen displaceable by the metal under the conditions employed in the reaction, which solvent boils at a temperature above the normal boiling point of trimethylene chloride, and in the presence of a suitable catalyst of the class consisting of preformed Grignard reagents and substances which catalyze the formation of Grignard reagents, to yield a chloride of the metal and cyclopropane.

15. The process of producing cyclopropane, which consists in causing trimethylene chloride to react with sodium at a temperature above the boiling point of trimethylene chloride under boiling-point-raising conditions and in the substantial absence of any compound containing hydrogen displaceable by sodium under the conditions employed in the reaction.

HENRY B. HASS.
GEORGE E. HINDS.

CERTIFICATE OF CORRECTION.

Patent No. 2,098,239.   November 9, 1937.

HENRY B. HASS, ET AL.

It is hereby certified that error appears in the printed specification of the above numbered patent requiring correction as follows: Page 2, second column, line 40, claim 4, for "at" read of; line 64, claim 7, after "react" insert the words at a temperature above the boiling point of trimethylene chloride; and that the said Letters Patent should be read with this correction therein that the same may conform to the record of the case in the Patent Office.

Signed and sealed this 25th day of January, 1938.

(Seal)

Henry Van Arsdale,
Acting Commissioner of Patents.

CERTIFICATE OF CORRECTION.

Patent No. 2,098,239. November 9, 1937.

HENRY B. HASS, ET AL.

It is hereby certified that error appears in the printed specification of the above numbered patent requiring correction as follows: Page 2, second column, line 40, claim 4, for "at" read of; line 64, claim 7, after "react" insert the words at a temperature above the boiling point of trimethylene chloride; and that the said Letters Patent should be read with this correction therein that the same may conform to the record of the case in the Patent Office.

Signed and sealed this 25th day of January, 1938.

(Seal)

Henry Van Arsdale,
Acting Commissioner of Patents.